(12) United States Patent
Oh

(10) Patent No.: US 11,190,712 B2
(45) Date of Patent: Nov. 30, 2021

(54) ILLUMINATION STATE MONITORING APPARATUS

(71) Applicant: LG ELECTRONICS INC., Seoul (KR)

(72) Inventor: Jae Yoon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/740,294

(22) Filed: Jan. 10, 2020

(65) Prior Publication Data

US 2021/0127076 A1 Apr. 29, 2021

(51) Int. Cl.
*H04N 5/33* (2006.01)
*G01J 1/42* (2006.01)
*G05D 1/02* (2020.01)

(52) U.S. Cl.
CPC ............ *H04N 5/332* (2013.01); *G01J 1/4204* (2013.01); *G05D 1/0238* (2013.01); *G05D 1/0242* (2013.01); *G05D 2201/0213* (2013.01)

(58) Field of Classification Search
None
See application file for complete search history.

(56) References Cited

U.S. PATENT DOCUMENTS 10,461,106 B2 * 10/2019 Ozawa .................... H01L 27/14
10,819,922 B2 * 10/2020 Sumi ................ H01L 27/14645
2010/0128129 A1 * 5/2010 Kim ......................... H04N 5/33
  348/164
2011/0017923 A1 * 1/2011 Kubo ....................... A61B 1/05
  250/458.1
2011/0193967 A1 * 8/2011 Matsumoto ........ H04N 5/23245
  348/164
2012/0087645 A1 * 4/2012 Wu .......................... H04N 9/04
  396/439
2014/0034835 A1 * 2/2014 Frey .................. H01L 31/02162
  250/349
2014/0347493 A1 * 11/2014 Higashitsutsumi .... G02B 5/208
  348/164
2016/0245698 A1 * 8/2016 Pau ........................ G01J 3/2803
2016/0366337 A1 * 12/2016 Duran .................... H04N 9/045
2018/0295336 A1 * 10/2018 Chen ..................... G01B 11/25

* cited by examiner

*Primary Examiner* — Christopher G Findley
(74) *Attorney, Agent, or Firm* — Lee, Hong, Degerman, Kang & Waimey PC

(57) ABSTRACT

Disclosed herein is an illumination state monitoring apparatus, the illumination state monitoring apparatus, including a dual band pass filter having a first pass band in the visible wavelength area and having a second pass band in the infrared wavelength area, an optical sensor detecting light having passed through the dual band pass filter through a three primary color pixel and an infrared pixel, and a processor deducting an intensity value of a signal detected by the infrared pixel from an intensity value of a signal detected by the three primary color pixel, calculating an illuminance parameter, and determining an illumination state on the basis of the illuminance parameter, wherein sensitivity of the three primary color pixel toward light having passed through the second pass band and sensitivity of the infrared pixel toward light having passed through the second pass band are within a predetermined range.

14 Claims, 16 Drawing Sheets

ILLUMINATION STATE MONITORING APPARATUS

CROSS-REFERENCE TO RELATED APPLICATION

Pursuant to 35 U.S.C. § 119(a), this application claims the benefit of earlier filing date and right of priority to Korean Patent Application No. 10-2019-0133383, filed on Oct. 25, 2019, the contents of which are all hereby incorporated by reference herein in its entirety.

BACKGROUND

1. Field

The present disclosure relates to an illumination state monitoring apparatus that monitors an illumination state by correcting errors caused by a similarity in sensitivity of a three primary color pixel and sensitivity of an infrared pixel in the infrared wavelength area.

2. Background

In recent years, attempts to commercialize an autonomous vehicle have been made. In relation to the autonomous vehicle, technologies for detecting external illuminance and for controlling an autonomous vehicle on the basis of the detected illuminance have been developed.

According to today's technology, an illuminance sensor is required to be additionally provided in a vehicle to detect external illuminance. The illuminance sensor is an expensive component as well as a physical component that occupies volume of the vehicle to a certain level.

Additionally, the autonomous vehicle is basically equipped with an optical sensor such as a camera for capturing an external image. The optical sensor may also detect external light. Accordingly, technologies for exactly figuring out external illuminance through an optical sensor without an additional illuminance sensor are required for the optical sensor.

SUMMARY

The preset disclosure is directed to providing an illumination state monitoring apparatus that may determine an illumination state corresponding to an actual external environment using an optical sensor.

The present disclosure is also directed to providing an illumination state monitoring apparatus that may allow a passenger in a vehicle to confirm an external image of the vehicle regardless of actual external illuminance.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

The present disclosure may determine an illumination state corresponding to an actual external environment by deducting an amount of light incorrectly detected by infrared light from an entire amount of light detected by a three primary color pixel.

The present disclosure may also allow a passenger in a vehicle to confirm an external image of the vehicle regardless of actual external illuminance by generating a visible image or an infrared image of a space outside of the vehicle according to an illumination state and by outputting the images to the inside of the vehicle through a display module.

The present disclosure may determine an illumination state corresponding to an actual external environment only using an optical sensor that is basically mounted on to a vehicle to capture an external image, thereby figuring out external illuminance without an additional illuminance sensor.

The present disclosure may also allow a passenger in a vehicle to confirm an external image of the vehicle regardless of actual external illuminance, thereby ensuring high visibility outside of the vehicle all the time.

Detailed effects of the present disclosure are described together with the above-described effects in the detailed description of the disclosure.

BRIEF DESCRIPTION OF THE DRAWINGS

Embodiments are described in detail with reference to the following drawings, wherein.

DETAILED DESCRIPTION

Figure 1:
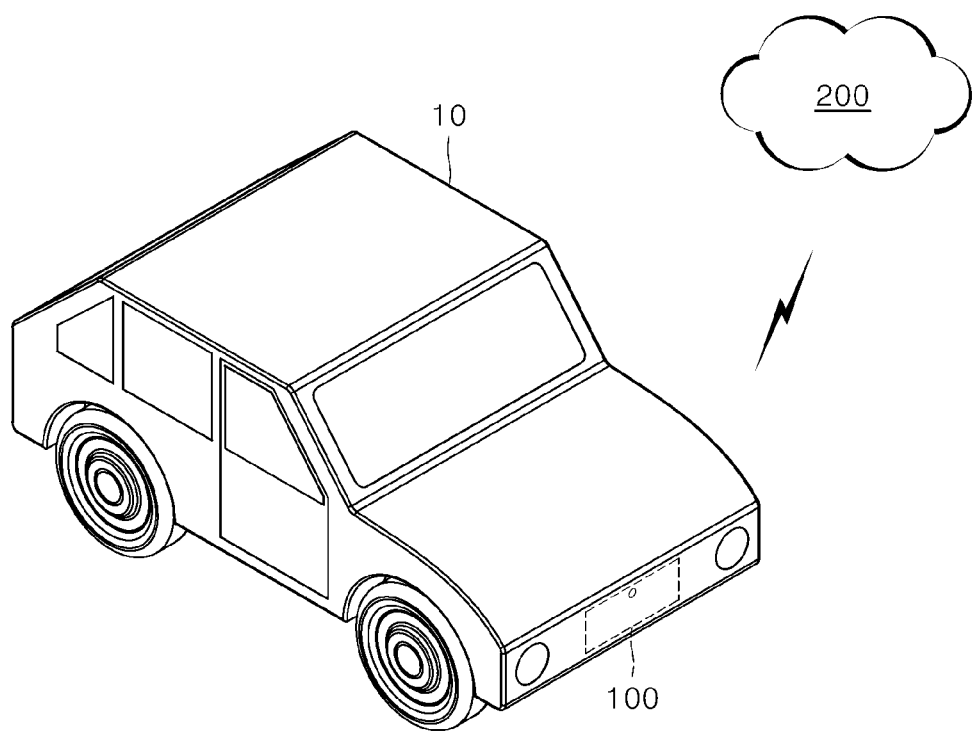
FIG. 1 is a view illustrating an exemplary illumination state monitoring apparatus provided in a vehicle.

The above-described objectives, features and advantages are specifically described with reference to the attached drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the attached drawings. Throughout the drawings, identical reference numerals denote identical or similar components.

In describing components of the present disclosure, terms such as first, second, and the like may be used. These terms are only intended to distinguish a component from another component, and the components are not limited to such terms. Certainly, unless explicitly stated otherwise, a first component may denote a second component.

When a component is described as being "connected" to another component, it will be understood that the components may be directly "connected" or an additional component may be "interposed" between the two components, or the two components may be "connected" through an additional component.

The singular forms "a", "an" and "the" are intended to include the plural forms as well, unless explicitly indicated otherwise. It will be further understood that the terms "comprise" or "have," when used in this specification, should not be interpreted as necessarily including stated components, or steps but may be interpreted as including some of the stated components or steps or should be interpreted as further including additional components or steps.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

The present disclosure relates to an illumination state monitoring apparatus that monitors an illumination state by correcting errors caused by a similarity in sensitivity of a three primary color pixel and sensitivity of an infrared pixel in the infrared wavelength area.

Below, an exemplary illumination state monitoring apparatus is described with reference to FIGS. 1 to 6, and FIGS. 7A, 7B, 8A, and 8B.

Figure 2:
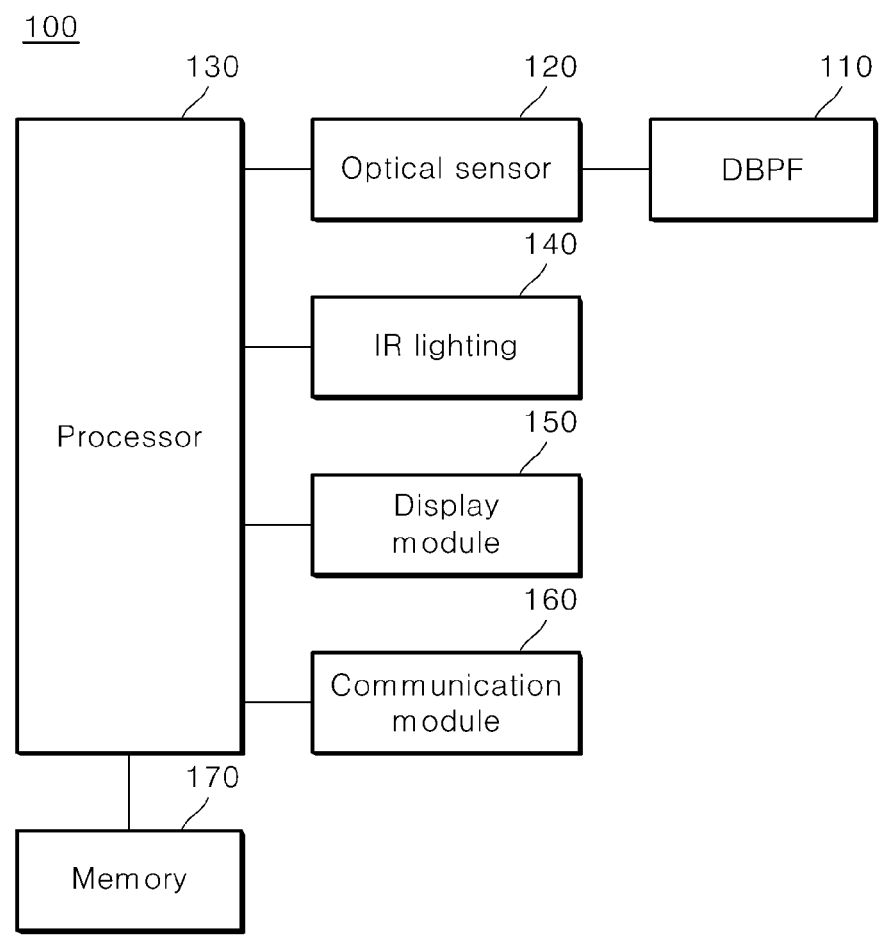
FIG. 2 is a view briefly illustrating an inner configuration of an exemplary illumination state monitoring apparatus.

FIG. 1 is a view illustrating an exemplary illumination state monitoring apparatus provided in a vehicle, and FIG. 2 is a view briefly illustrating an inner configuration of an exemplary illumination state monitoring apparatus.

Figure 3:
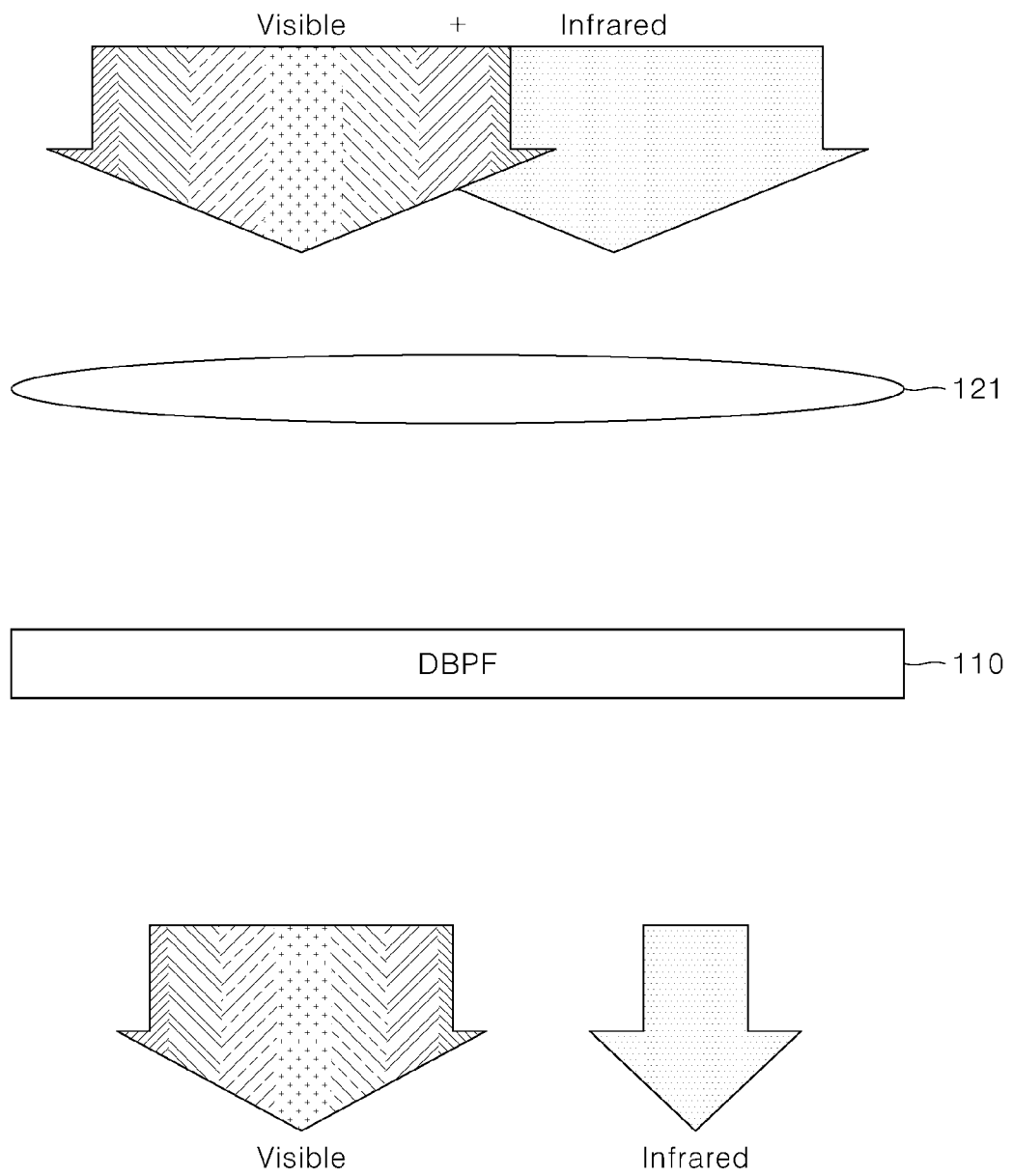
FIG. 3 is a view illustrating external light that is separated into visible light and infrared light by passing through a dual band pass filter.
Figure 4:
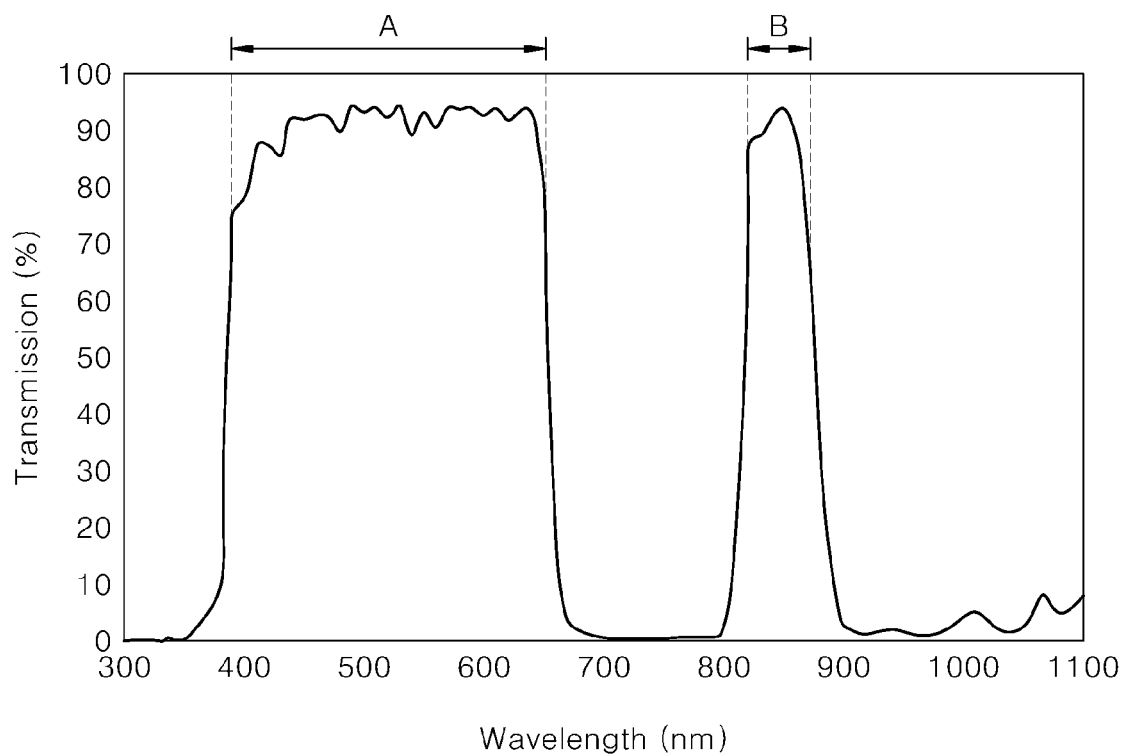
FIG. 4 is a view illustrating pass bands of the dual band pass filter in FIG. 3.

FIG. 3 is a view illustrating external light that is separated into visible light and infrared light by passing through a dual band pass filter, and FIG. 4 is a view illustrating pass bands of the dual band pass filter in FIG. 3.

Figure 5:
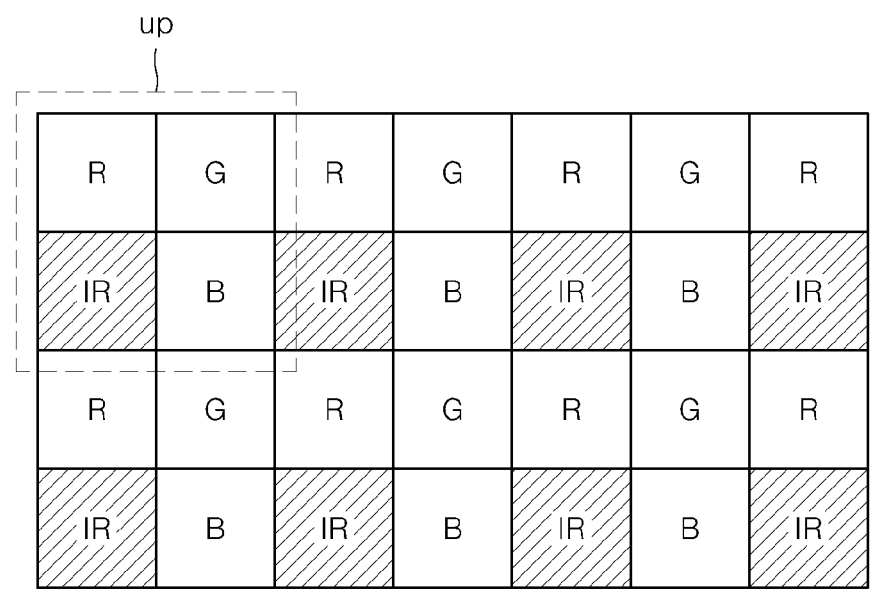
FIG. 5 is a view illustrating pixels included in an optical sensor.
Figure 6:
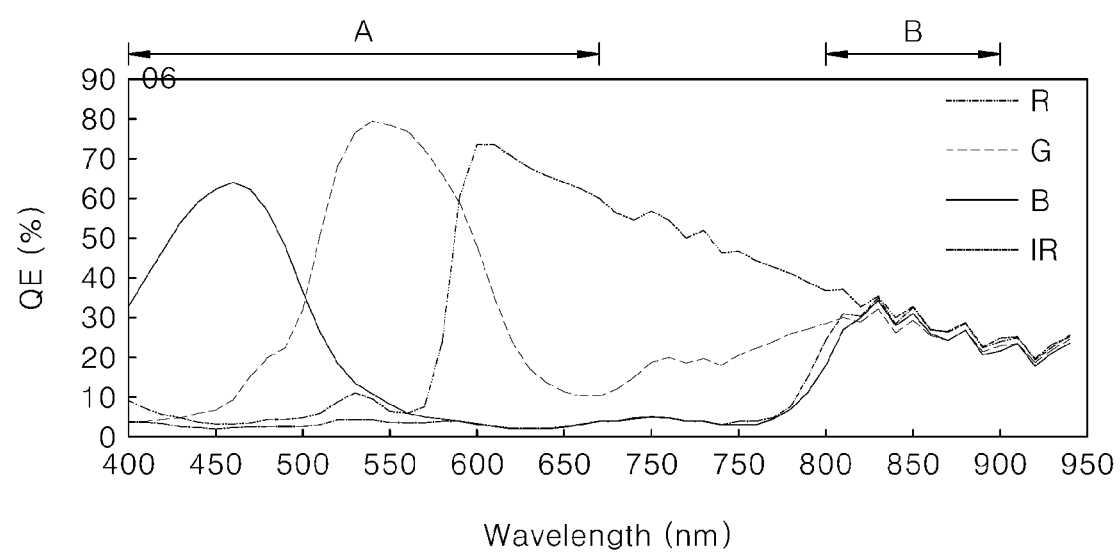
FIG. 6 is a view illustrating sensitivity of a three primary color pixel and sensitivity of an infrared pixel.

FIG. 5 is a view illustrating pixels included in an optical sensor, and FIG. 6 is a view illustrating sensitivity of a three primary color pixel and sensitivity of an infrared pixel.

Figure 7A:
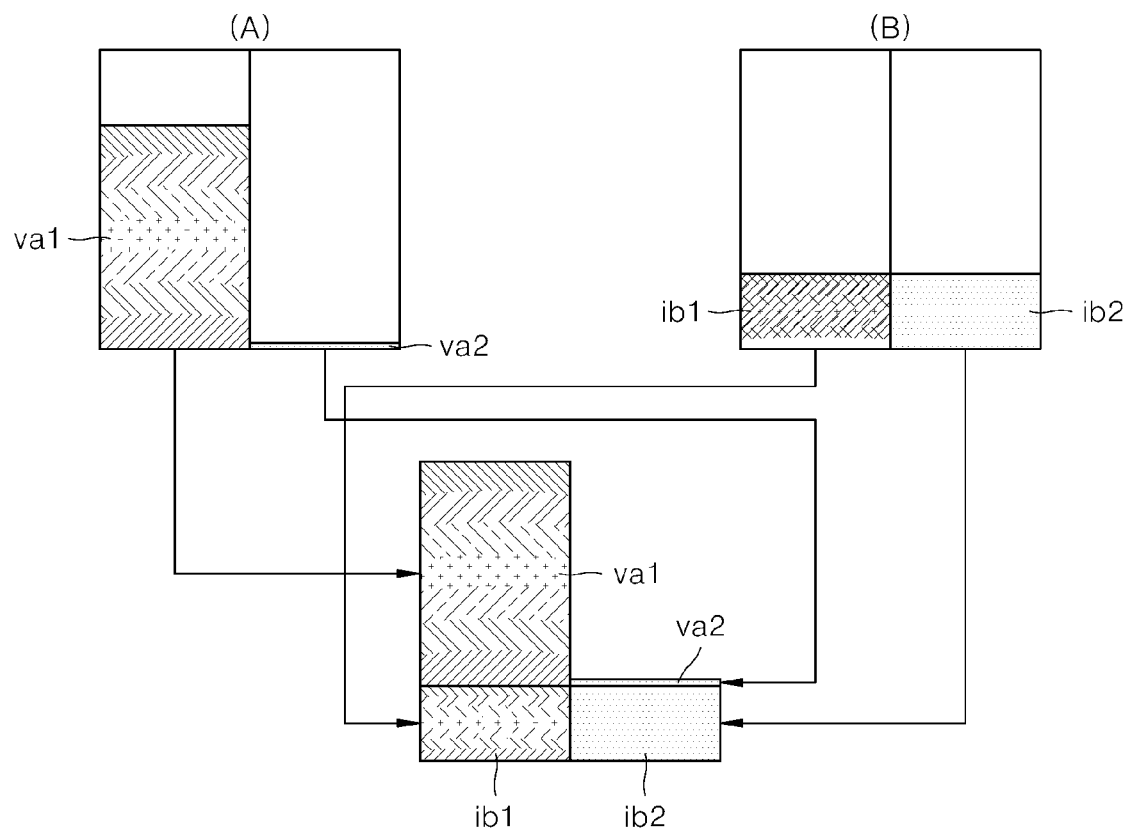
FIG. 7A is a view respectively illustrating visible light and infrared light detected through each pass band in FIG. 4 in an environment in which visible light is more intense than infrared light.
Figure 7B:
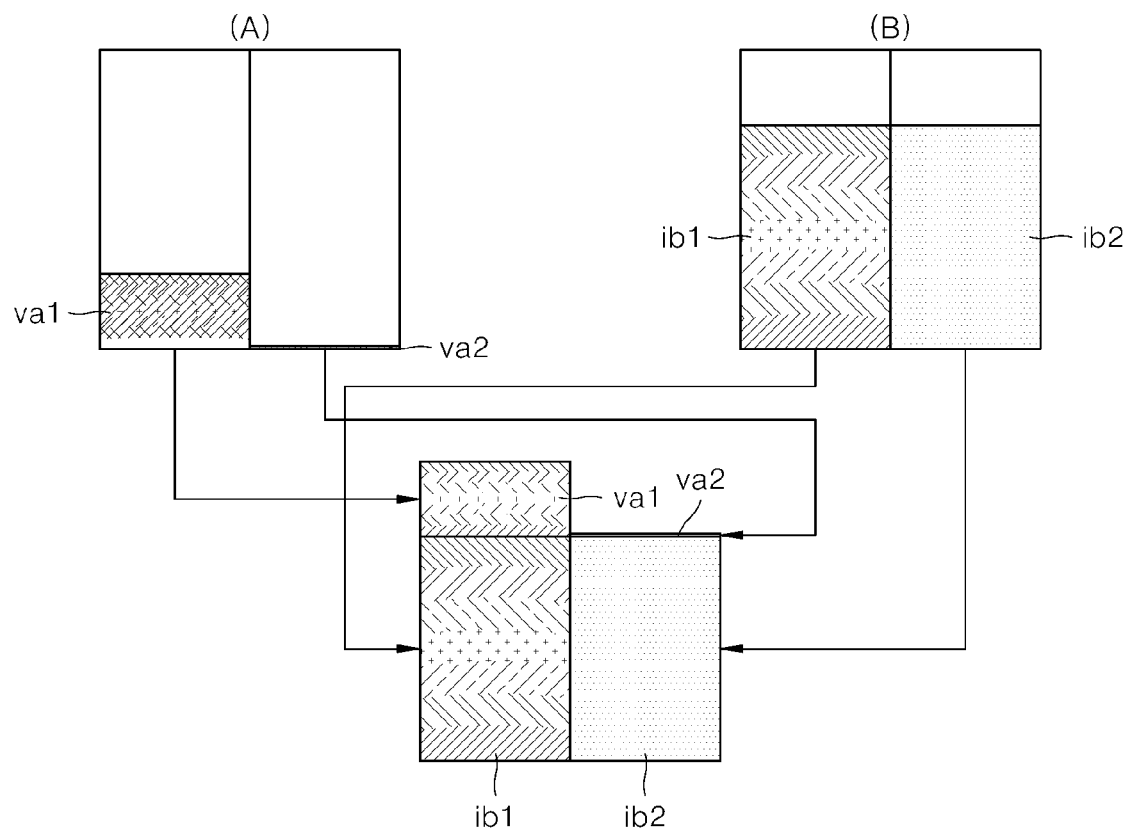
FIG. 7B is a view respectively illustrating visible light and infrared light detected through each pass band in FIG. 4 in an environment in which infrared light is more intense than visible light.

FIG. 7A is a view respectively illustrating visible light and infrared light detected through each pass band in FIG. 4 in an environment in which visible light is more intense than infrared light. Additionally, FIG. 7B is a view respectively illustrating visible light and infrared light detected through each pass band in FIG. 4 in an environment in which infrared light is more intense than visible light.

Figure 8A:
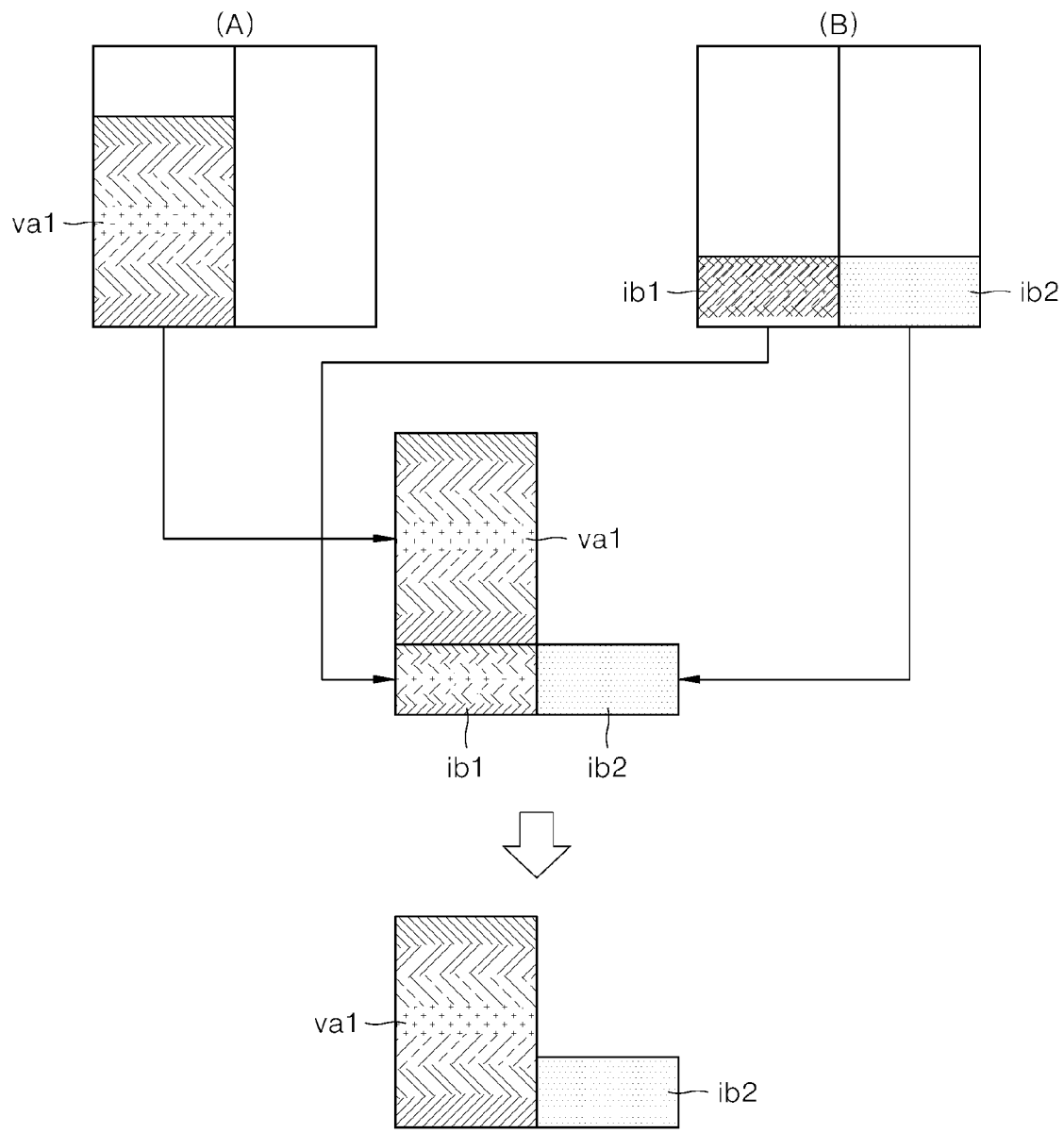
FIG. 8A is a view illustrating an illumination state determining process in an environment in which visible light is more intense than infrared light.
Figure 8B:
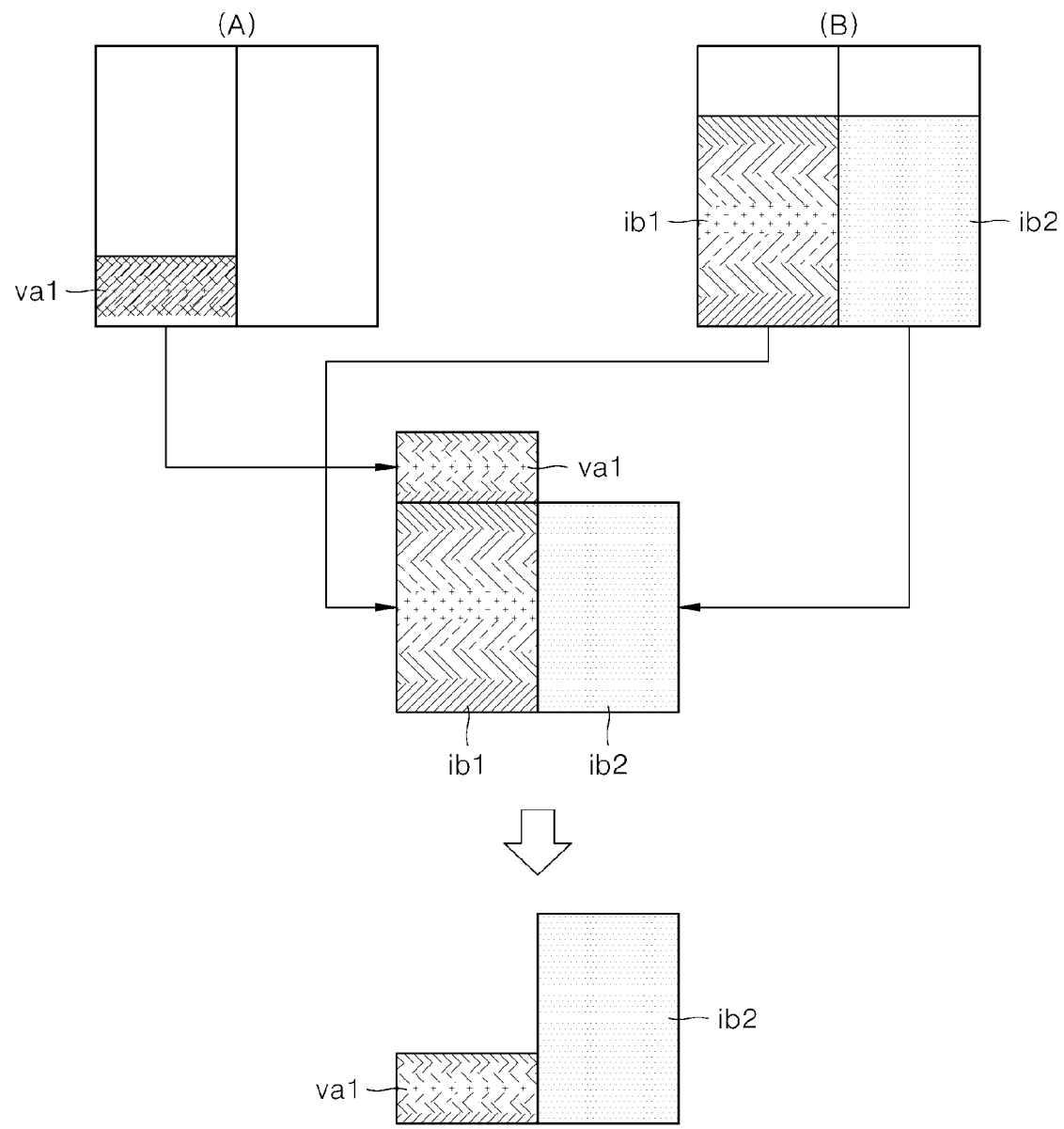
FIG. 8B is a view illustrating an illumination state determining process in an environment in which infrared light is more intense than visible light.

FIG. 8A is a view illustrating an illumination state determining process in an environment in which visible light is more intense than infrared light. Additionally, FIG. 8B is a view illustrating an illumination state determining process in an environment in which infrared light is more intense than visible light.

Referring to FIG. 1, a below-described illumination state monitoring apparatus 100 may be mounted onto a vehicle 10 and may perform an operation of determining an illumination state outside of the vehicle 10.

The vehicle 10 onto which the illumination state monitoring apparatus 100 is mounted may be a vehicle that is operated by a user's manipulation, or may be a vehicle that drives autonomously without a user's intervention. The vehicle 10 may be implemented as an internal combustion engine vehicle that is provided with an engine as a power source, a hybrid vehicle that is provided with an engine and an electric motor as a power source, an electric vehicle that is provided with an electric motor as a power source, a fuel cell electric vehicle that is provided with a fuel cell as a power source, and the like.

The vehicle 10 to which the present disclosure is applied may be associated with any artificial intelligence module, any drone, any unmanned aerial vehicle, any robot, any augmented reality (AR) module, any virtual reality (VR) module, any 5G mobile communication device and the like.

The illumination state monitoring apparatus 100 may monitor an illumination state outside of the vehicle 10 by itself without data communication with a server 200, and may monitor an illumination state outside of the vehicle 10 in association with a server 200. Specifically, a below-described illumination state determining method may be carried out by a processor 130 in the vehicle 10 or may be performed by a processor in the server 200.

When the illumination state determining method is carried out by the processor in the server 200, the illumination state monitoring apparatus 100 and the server 200 may perform data communication. A detailed method for data communication is described below with reference to FIGS. 9 to 14. First, a process in which the illumination state determining method of the present disclosure is carried out by the processor 130 of the vehicle 10 is described.

Referring to FIG. 2, an exemplary illumination state monitoring apparatus 100 may include a processor 130 that controls above-described parts and components with reference to an optical sensor 120 connected with a dual band pass filter (DBPF) 110, IR lighting 140, a display module 150, a communication module 160, and a memory 170. The illumination state monitoring apparatus 100 illustrated in FIG. 2 is provided as an exemplary embodiment, and parts and components of the illumination state monitoring apparatus 100 are not limited to those of the exemplary embodiment in FIG. 2. When necessary, some parts and components may be added, modified or removed.

The optical sensor 120, the IR lighting 140, the display module 150, the communication module 160, and the processor 130, illustrated in FIG. 2, may be implemented as a physical component including at least one of application specific integrated circuits (ASICs), digital signal processors (DSPs), digital signal processing devices (DSPDs), programmable logic devices (PLDs), and field programmable gate arrays (FPGAs).

The optical sensor 120 may detect light filtered by the dual band pass filter 110.

Referring to FIG. 3, external light in which visible light and infrared light are mixed may be input to the dual band pass filter 110 through a lens 121 provided in the optical sensor 120. Light having passed through the dual band pass filter 110 may be separated into visible light and infrared light that have separated wavelength areas.

To this end, the dual band pass filter 110 may have a first pass band in the visible wavelength area and may have a second pass band in the infrared wavelength area.

Referring to FIG. 4, the dual band pass filter 110, which is a filter in which two pass bands are set according to wavelengths, may have the first pass band for separating only visible light from the external light and the second pass band for separating only infrared light from the external light.

Specifically, for example, the first pass band, which is the visible wavelength area (A), may be formed within a range of 380 nm to 700 nm, and the second pass band, which is the infrared wavelength area (B), may be formed within a range of 850 nm to 1100 nm.

The optical sensor 120 may detect light having passed through the dual band pass filter 110 through a three primary color pixel and an infrared pixel. In other words, the optical sensor 120 may detect visible light, separated by the dual band pass filter 110, through the three primary color pixel, and may detect infrared light, separated by the dual band pass filter 110, through the infrared pixel.

Specifically, electric features (e.g., electric currents and voltages) of the three primary color pixel may be changed according to input visible light, and electric features of the infrared pixel may be changed according to input infrared light. In this case, the optical sensor 120 may detect visible light and infrared light by measuring changes in the electric features, which occur in the three primary color pixel and the infrared pixel.

Referring to FIG. 5, the optical sensor 120 may be comprised of a plurality of unit pixels (up) that are arranged in a matrix form, and each unit pixel (up) may be comprised of a three primary color pixel (R, G, and B) and an infrared pixel (IR).

The three primary color pixel may be comprised of an R pixel, a G pixel and a B pixel that may respectively detect three primary colors of light. The R pixel may detect red among the three primary colors of light, the G pixel may detect green among the three primary colors of light, and the B pixel may detect blue among the three primary colors of light.

The R pixel, the G pixel, the B pixel and the infrared pixel may be arranged in a matrix form within a unit pixel. Accordingly, light input to a unit pixel may be detected by at least one of the R pixel, the G pixel, the B pixel and the infrared pixel.

Sensitivity levels of the three primary color pixel and the infrared pixel may vary according to wavelengths.

FIG. 6 is a view illustrating quantum efficiency (QE), as a parameter indicating sensitivity according to a wavelength of each pixel.

Referring to FIG. 6, in the visible wavelength area (A) corresponding to the first pass band, the R pixel, the G pixel, and the B pixel in the three primary color pixel may respectively have the highest sensitivity level, while the infrared pixel may have a very low sensitivity level. In other words, sensitivity of the infrared pixel towards light having passed through the first pass band may be lower than predetermined sensitivity (e.g., quantum efficiency 5%).

The infrared pixel may have the highest sensitivity level in the infrared wavelength area (B) corresponding to the second pass band. In this case, the infrared pixel and the three primary color pixel may have a very similar sensitivity level. In other words, sensitivity of the three primary color pixel and sensitivity of the infrared pixel toward light having passed through the second pass band may be within a predetermined range (e.g., quantum efficiency 3%).

The processor 130 may determine an illumination state on the basis of intensity of a signal detected by the three primary color pixel and the infrared pixel. In this specification, an illumination state, which is any information including information on external illuminance, may be determined as a linear value such as illuminance, or may be defined as a state such as a day state and a night state that may be classified according to a specific standard. Below, an illumination state classified as a day state and a night state is described for convenience of description.

An illumination state determining method carried out by the processor 130 in an external environment in which visible light is more intense than infrared light is described with reference to FIGS. 3 and 7A.

As illustrated in FIG. 3, light having passed through the first pass band configured in the visible wavelength area (A) may be visible light, and visible light may be detected by the optical sensor 120.

As illustrated in FIG. 6, in the visible wavelength area (A), the three primary color pixel may have a very high sensitivity level, while the infrared pixel may have a very low sensitivity level. Accordingly, as illustrated in FIG. 7A, in the visible wavelength area (A), a very large amount of visible light (va1) may be detected by the three primary color pixel, while a very small amount of visible light (va2) may be detected by the infrared pixel, due to the external environment in which visible light is intense.

As illustrated in FIG. 3, light having passed through the second pass band configured in the infrared wavelength area (B) may be infrared light, and infrared light may be detected by the optical sensor 120.

As illustrated in FIG. 6, the three primary color pixel and the infrared pixel may have a similar sensitivity level in the infrared wavelength area (B). Accordingly, as illustrated in FIG. 7A, an amount of infrared light (ib1) detected by the three primary color pixel may be similar to an amount of infrared light (ib2) detected by the infrared pixel, in the infrared wavelength area (B), and a small amount of infrared light may be detected due to the external environment in which infrared light is less intense than visible light.

The processor 130 may add up amounts of light (va1, and ib1) detected by the three primary color pixel, may add up amounts of light (va2, and ib2) detected by the infrared pixel, in the first and second pass bands, and then may compare the two added up amounts. As a result of comparison, because a total of the amounts of light (va1, and ib1) detected by the three primary color pixel is greater than a total of the amounts of light (va2, and ib2) detected by the infrared pixel, the processor 130 may determine that a current illumination state is a day state.

In this case, the illumination state (a day state) determined by the processor 130 may correspond to an actual external environment in which visible light is more intense than infrared light.

Next, an illumination state determining method carried out by the processor 130 in an external environment in which infrared light is more intense than visible light is described with reference to FIGS. 3 and 7B.

As described above, in the visible wavelength area (A), the three primary color pixel may have a very high sensitivity level, while the infrared pixel may have a very low sensitivity level. Accordingly, as illustrated in FIG. 7B, in the visible wavelength area (A), a small amount of visible light (va1) may be detected by the three primary color pixel, and very little amount of visible light (va2) may be detected by the infrared pixel, due to the external environment in which visible light is less intense than infrared light.

As described above, the three primary color pixel and the infrared pixel may have a similar sensitivity level. Accordingly, as illustrated in FIG. 7B, an amount of infrared light (ib1) detected by the three primary color pixel may be similar to an amount of infrared light (ib2) detected by the infrared pixel, in the infrared wavelength area (B), and a large amount of infrared light may be detected due to the external environment in which infrared light is intense.

The processor 130 may add up amounts of light (va1, and ib1) detected by the three primary color pixel, may add up amounts of light (va2, and ib2) detected by the infrared pixel, in the first and second pass bands, and then may compare the two added up amounts. As a result of comparison, because a total of the amounts of light (va1, and ib1) detected by the three primary color pixel is greater than a total of the amounts of light (va2, and ib2) detected by the infrared pixel, the processor 130 may determined that a current illumination state is a day state.

In this case, the illumination state (a day state) determined by the processor 130 may be opposite to an actual external environment in which infrared light is more intense than visible light.

That is, as illustrated in FIG. 7B, the processor 130 may make an error by determining that the illumination state is a state opposite to an actual external environment in the external environment in which infrared light is more intense than visible light. The error may result from a similarity between sensitivity of the three primary color pixel and sensitivity of the infrared pixel in the infrared wavelength area (B).

To prevent an error in determining an illumination state, the processor 130 of the disclosure may calculate an illuminance parameter by deducting an intensity value of a signal detected by the infrared pixel from an intensity value of a signal detected by the three primary color pixel considering sensitivity properties according to each wavelength, and, on the basis of the illuminance parameter, may determine an illumination state.

In other words, the processor 130 may calculate an illuminance parameter by deducting an amount of light detected by the three primary color pixel in the infrared wavelength area from a total amount of light detected by the three primary color pixel, and, on the basis of the illuminance parameter, may determine an illumination state.

In the present disclosure, the illuminance parameter, which is any parameter indicating illuminance, may be defined as a parameter having the unit of Lux (lx), and may also be defined as a parameter having the unit of $cd/m^2$ or stilb (sb).

The processor 130 may calculate a brightness value on the basis of an average value of signals detected by the three primary color pixel, and may calculate an illuminance parameter by deducting an intensity value of a signal detected by the infrared pixel from the calculated brightness value. In this case, the illuminance parameter may be calculated as a parameter in relation to brightness having the unit of $cd/m^2$ or stilb (sb).

As illustrated in FIG. 5, the optical sensor 120 may include a plurality of three primary color pixels. The processor 130 may identify signals detected by each three primary color pixel, and may calculate an average value of the signals. Specifically, the processor 130 may calculate an average value of signals detected respectively by a plurality of R pixels, a plurality of G pixels, and a plurality of B pixels.

Next, the processor 130 may calculate a brightness value on the basis of the calculated average value. Specifically, the processor 130 may convert an average value of signals detected by the three primary color pixel into a brightness value with reference to the memory 170. To this end, the memory 170 may store a conversion algorithm and a coefficient, a correction value, a color correction matrix and the like used for the conversion algorithm.

A method which is generally known to those in the art to which the disclosure pertains is applied to conversion of signals (RGB) detected by the three primary color pixel into a brightness value. Accordingly, detailed description in relation to the method is omitted.

The processor 130 may calculate an illuminance parameter by deducting an intensity value of a signal detected by the infrared pixel from the calculated brightness value.

As illustrated in FIG. 5, the optical sensor 120 may include a plurality of infrared pixels. In this case, the processor 130 may calculate an illuminance parameter by deducting an average value of signals detected by the infrared pixel from the calculated brightness value.

The processor 130 may also calculate an illuminance parameter by deducting an average value of signals detected by the infrared pixel from an average value of signals detected by the three primary color pixel. In other words, the processor 130 may also calculate an illuminance parameter without calculating the above-described brightness value. In this case, the illuminance parameter may be calculated as a parameter in relation to illuminance having the unit of Lux (lx).

Below, an illumination state determining method according to an illuminance parameter respectively in the external environment in which visible light is more intense than infrared light and in the external environment in which infrared light is more intense than visible light is described with reference to FIGS. 8A and 8B.

As described above, a very small amount of light is detected by the infrared pixel in the visible wavelength area (A). Accordingly, in FIGS. 8A and 8B, suppose that there is no amount of light detected by the infrared pixel in the visible wavelength area (A), for convenience of description.

Referring to FIGS. 8A and 8B, in the first and second pass bands configured in the visible wavelength area (A) and the infrared wavelength area (B), signals detected by the three primary color pixel may be a total of va1+ib1, and signals detected by the infrared pixel may be a total of ib2, as illustrated in FIGS. 7A and 7B. In this case, magnitude of ib1 may be the same as magnitude of ib2.

The processor 130 may calculate an illuminance parameter by deducting a signal (ib2) detected by the infrared pixel from a total signal (va1+ib1) detected by the three primary color pixel. In this case, the illuminance parameter may be calculated as va1 because ib1 is the same as ib2.

When the illuminance parameter is greater than a reference value, the processor 130 may determine that an illumination state is a day state, and when the illuminance parameter is lower than a reference value, the processor 130 may determine that an illumination state is a night state. To this end, the memory 170 may previously store a reference value.

In FIG. 8A, the processor 130 may compare the illuminance parameter calculated as va1 with a reference value, may determine va1 is greater than the reference value, and may determine that an illumination state is a day state. In this case, the illumination state (a day state) determined by the processor 130 may correspond to an actual external environment in which visible light is more intense than infrared light.

In FIG. 8B, the processor 130 may compare the illuminance parameter calculated as va1 with a reference value, may determine va1 is lower than the reference value, and may determine that an illumination state is a night state. In this case, the illumination state (a night state) determined by the processor 130 may correspond to an actual external environment in which infrared light is more intense than visible light.

The present disclosure, as described above, may figure out illuminance by actual visible light by deducting an amount of infrared light detected by the three primary color pixel from a total amount of light detected by the three primary color pixel, and on the basis of the illuminance, may determine an illumination state corresponding to an actual external environment.

That is, the present disclosure may determine an illumination state corresponding to an actual external environment using the optical sensor 120, thereby figuring out external illuminance only using the optical sensor 120 basically mounted onto the vehicle 10 to capture an external image without an additional illuminance sensor.

The processor 130 may generate at least one of a visible image and an infrared image using light detected by the optical sensor 120, and the display module 150 may output at least one of the visible image and the infrared image.

The display module 150, for example, may be provided in the vehicle 10 and may provide an image outside of the vehicle 10 to a passenger. The processor 130 may generate an image outside of the vehicle 10 as at least one of a visible image and an infrared image using light detected by the above-described three primary color pixel and infrared pixel. The processor 130 may provide the generated image outside of the vehicle 10 to the display module 150, and the display module 150 may output the image.

Specifically, when determining the illumination state is a day state, the processor 130 may generate a visible image as an image outside of the vehicle 10 using light detected by the three primary color pixel, and the display module 150 may output the visible image. Accordingly, in an external environment in which visible light is more intense than infrared light, the passenger may confirm the visible image expressed as a combination of three primary colors corresponding to actual visible light.

When determining the illumination state is a night state, the processor 130 may generate an infrared image as an image outside of the vehicle 10 using light detected by the infrared pixel, and the display module 150 may out put the infrared image. Accordingly, in an external environment in which infrared light is more intense than visible light, the passenger may confirm the infrared image expressed as a combination of three primary colors corresponding to intensity of infrared light.

The present disclosure, as described above, enables the passenger in the vehicle 10 to confirm an external image of the vehicle 10 regardless of actual external illuminance, thereby ensuring high visibility of the space outside of the vehicle 10 all the time.

For operations of the above-described processor 130, the infrared pixel is required to receive infrared light. When there is no object naturally emitting infrared light outside of the vehicle 10, very little amount of infrared light may be detected by the infrared pixel.

To solve the problem, the illumination state monitoring apparatus 100 may further include IR lighting 140 that outputs infrared light. The IR lighting 140 may be provided near the optical sensor 120, and may emit infrared light to a space outside of the vehicle 10.

The infrared light emitted to the space outside of the vehicle 10 may be reflected by an obstacle around the vehicle 10, and the reflected infrared light may be detected by the optical sensor 120.

The processor 130 may control an output from the IR lighting 140 to generate an infrared image. Specifically, the processor 130 may control an output from the IR lighting 140 according to illumination states.

In an embodiment, the processor 130 may control an output from the IR lighting 140 only when the illumination state is a night state. When the illumination state is a night state, the processor 130, as described above, may generate an infrared image using infrared light detected by the optical sensor 120. In this case, when there is a small number of objects naturally emitting infrared light outside of the vehicle 10, very little amount of infrared light may be detected by the optical sensor 120. Accordingly, when the illumination state is a night state, the processor 130 may increase an output from the IR lighting 140, and may increase an amount of infrared light detected by the optical sensor 120.

In another embodiment, the illumination state may be a linear value such as illuminance or brightness. In this case, the processor 130 may control an output from the IR lighting 140 according to a value of an illumination state. Specifically, when the illumination state is illuminance, the processor 130 may control an output from the IR lighting 140 such that the output from the IR lighting 140 may be inversely proportional to illuminance. Accordingly, the processor 130 may gradually increase an output from the IR lighting 140 when a space outside of the vehicle 10 becomes darker, and, accordingly, may increase an amount of infrared light detected by the optical sensor 120.

The illumination state determining process performed by the illumination state monitoring apparatus 100 in the vehicle 10 is described above. However, as mentioned in the introduction of the specification, the illumination state determining process may also be performed by a processor provided in a server 200. To this end, the illumination state monitoring apparatus 100 may perform data communication with the server 200 through a communication module 160.

Below, for convenience of description, suppose that the illumination state monitoring apparatus 100 transmits a signal detected through the optical sensor 120 (hereinafter referred to as "detection signal") to the server 200, and that the server 200 determines an illumination state on the basis of the detection signal and transmits information on the illumination state (hereinafter referred to as "illumination state information") to the illumination state monitoring apparatus 100.

Figure 9:
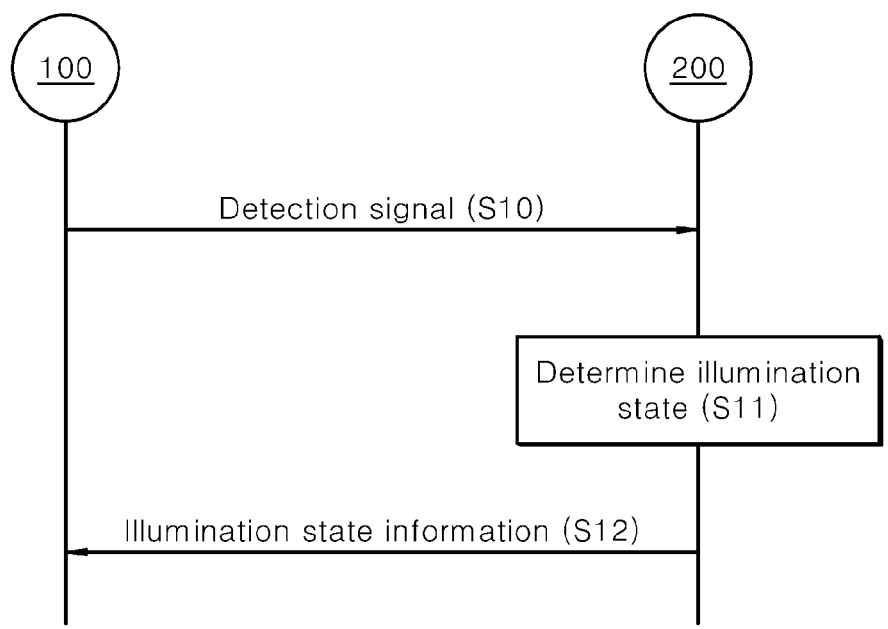
FIG. 9 is a view briefly illustrating a process of data communication between the illumination state monitoring apparatus and the server in FIG. 1.

FIG. 9 is a view briefly illustrating a process of data communication between the illumination state monitoring apparatus 100 and the server 200 in FIG. 1.

Referring to FIG. 9, the illumination state monitoring apparatus 100 may transmit a detection signal detected by the optical sensor 120 to the server 200, and the server 200 may calculate an illuminance parameter on the basis of the detection signal, may determine an illumination state (S11), and then may transmit illumination state information to the illumination state monitoring apparatus 100 (S12).

For the above-described operations, the illumination state monitoring apparatus 100 and the server 200 may perform data communication through any wireless communication method that is used in the art to which the disclosure pertains. The illumination state monitoring apparatus 100 and the server 200 may perform data communication on 5G (5th Generation) networks. Below, data communication through 5G networks is described with reference to FIGS. 10 to 14.

Figure 10:
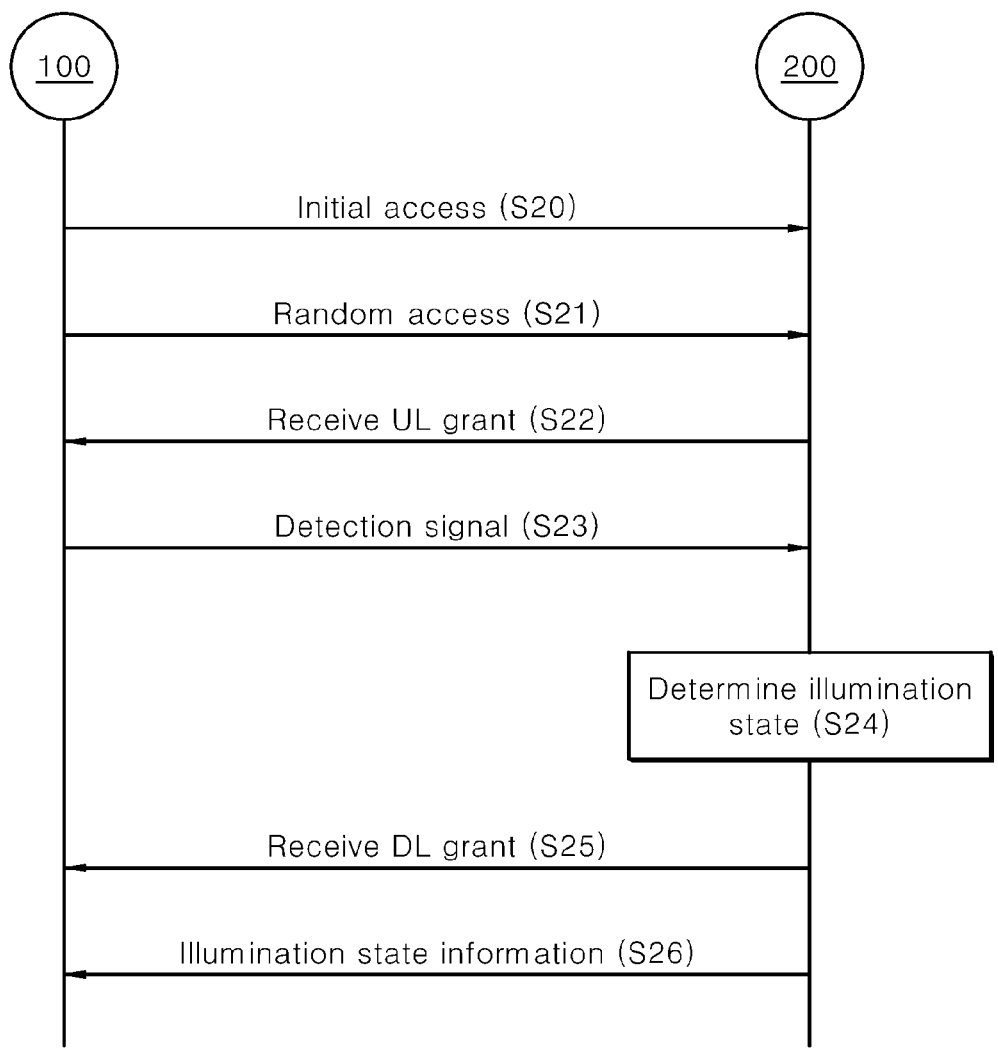
FIG. 10 is a view illustrating an example of a process of application communication between an exemplary illumination state monitoring apparatus and a server in a 5G system.

FIG. 10 is a view illustrating an example of a process of application communication between the vehicle 10 and the server 200 in a 5G communication system.

The illumination state monitoring apparatus 100 may make initial access to the server 200 (S20).

The process of initial access may include a cell search for acquiring a downlink (DL) operation, acquisition of system information, and the like.

Additionally, the illumination state monitoring apparatus 100 may make random access to the server 200 (S21).

The process of random access may include transmitting preamble, receiving a response to random access, and the like to acquire uplink (UL) synchronization or to transmit UL data.

Additionally, the server 200 may transmit a UL grant to the illumination state monitoring apparatus 100 in order for the illumination state monitoring apparatus 100 to schedule transmission of detection signals (S22).

Receiving a UL grant may include receiving time/frequency resource scheduling to transmit UL data to the server 200.

Additionally, the illumination state monitoring apparatus 100 may transmit detection signals to the server 200 on the basis of the UL grant (S23).

Additionally, the server 200 may perform an operation of determining an illumination state to transmit illumination state information on the basis of the detection signals (S24).

To receive the illumination state information from the server 200, the illumination state monitoring apparatus 100 may receive a DL grant through a physical downlink control channel (S25).

The server 200 may transmit the illumination state information to the illumination state monitoring apparatus 100 on the basis of the DL grant (S26).

An embodiment in which the process of initial access and/or random access of the illumination state monitoring apparatus 100 and 5G communication and the process of receiving a downlink grant are combined is exemplarily described above through steps 20 to 26 with reference to FIG. 10. However, the preset disclosure is not limited.

For example, the process of initial access and/or random access may be performed through steps 20, 22, 23, 24 and 25. Additionally, the process of initial access and/or random access may also be performed through steps 21, 22, 23, 24, and 26.

Operations of the illumination state monitoring apparatus 100 are exemplarily described above through steps 20 to 26 with reference to FIG. 10. However, the present disclosure is not limited.

For example, operations of the illumination state monitoring apparatus 100 may be performed in a way that steps 20, 21, 22, and 25 are optionally combined with steps 23 and 26. Additionally, for example, operations of the illumination state monitoring apparatus 100 may be comprised of steps 21, 22, 23 and 26. Further, for example, operations of the illumination state monitoring apparatus 100 may be comprised of steps 20, 21, 23, and 26. Furthermore, for example, operations of the illumination state monitoring apparatus 100 may be comprised of steps 22, 23, 25 and 26.

FIGS. 11 to 14 are views illustrating each example of a process in which an exemplary illumination state monitoring apparatus 100 operates using 5G communication.

Figure 11:
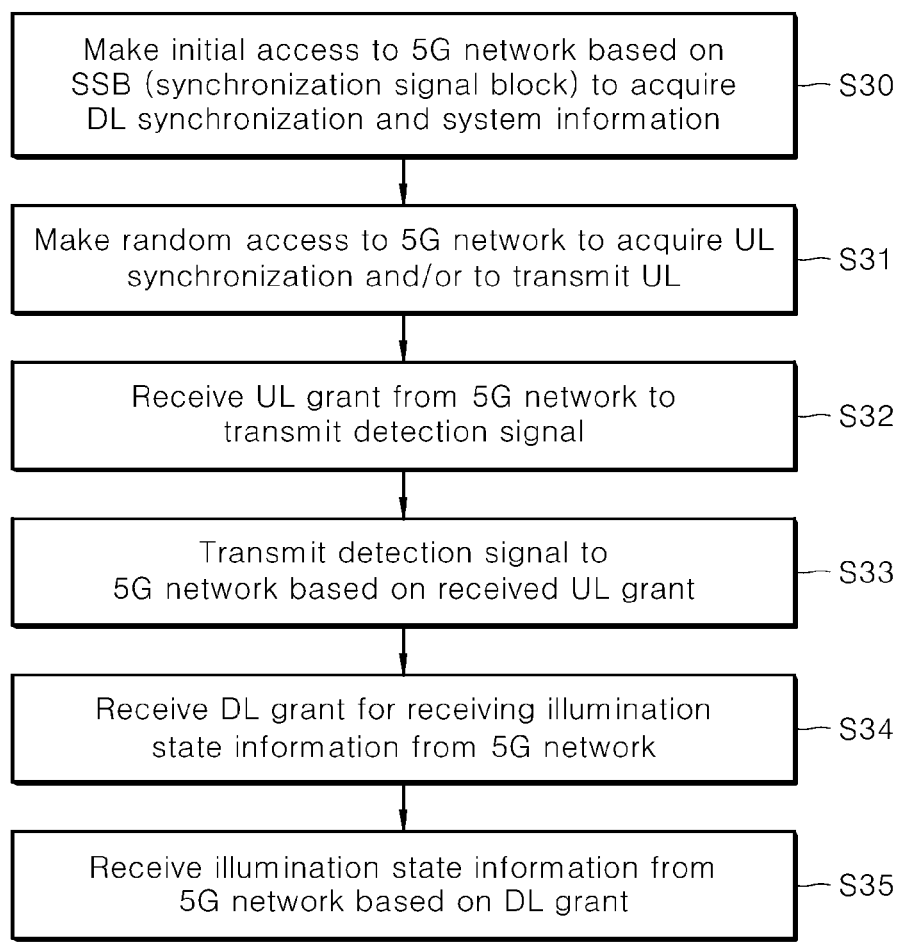
FIGS. 11 to 14 are views illustrating each example of a process in which an exemplary illumination state monitoring apparatus operates using 5G communication.

Referring to FIG. 11, the illumination state monitoring apparatus 100 may make initial access to the server 200 on the basis of a synchronization signal block (SSB) to acquire DL synchronization and system information (S30).

Additionally, the illumination state monitoring apparatus 100 may make random access to the server 200 to acquire UL synchronization and/or to transmit UL (S31).

Additionally, the illumination state monitoring apparatus 100 may receive a UL grant from the server 200 to transmit detection signals (S32).

Additionally, the illumination state monitoring apparatus 100 may transmit the detection signals to the server 200 on the basis of the UL grant (S33).

Additionally, the illumination state monitoring apparatus 100 may receive a DL grant for receiving illumination state information from the server 200 (S34).

Additionally, the illumination state monitoring apparatus 100 may receive the illumination state information from the server 200 on the basis of the DL grant (S35).

Beam management (BM) may be added in step 30, beam failure recovery in relation to PRACH (physical random access channel) transmission may be added in step 31, a QCL relation concerning a direction of reception of beams of PDCCH including a UL grant may be added in step 32, and a QCL relation concerning a direction of transmission of beams of PUCCH (physical uplink control channel)/PUSCH (physical uplink shared channel) including detection signals may be added in step 33. Additionally, a QCL relation concerning a direction of reception of beams of PDCCH including a DL grant may be added in step 34.

Figure 12:
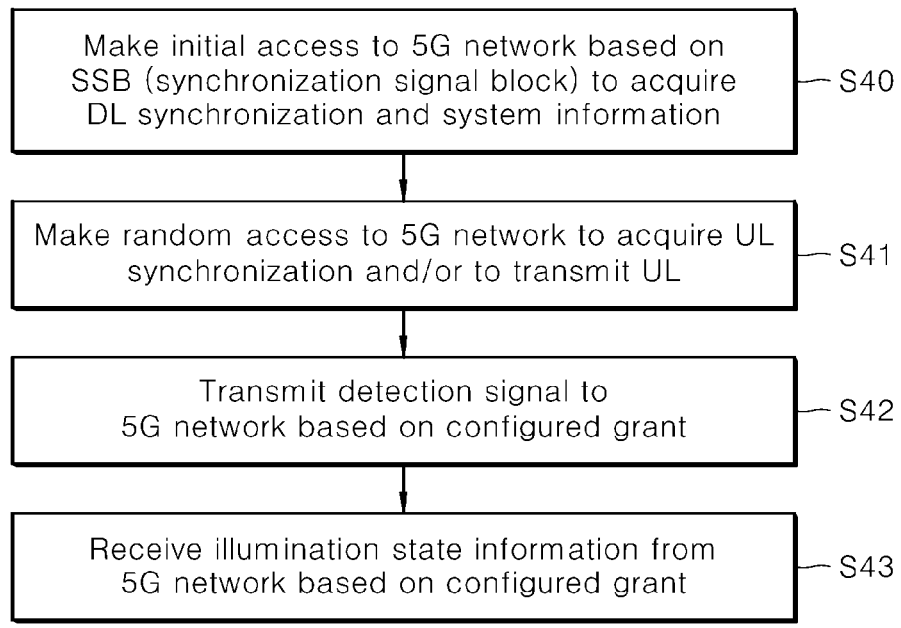

Referring to FIG. 12, the illumination state monitoring apparatus 100 may make initial access to the server 200 on the basis of an SSB to acquire DL synchronization and system information (S40).

Additionally, the illumination state monitoring apparatus 100 may make random access to the server 200 to acquire UL synchronization and/or to transmit UL (S41).

Additionally, the illumination state monitoring apparatus 100 may transmit detection signals to the server 200 on the basis of a configured grant (S42). In other words, instead of receiving a UL grant from the server 200, the illumination state monitoring apparatus 100 may also transmit the detection signals to the server 200 on the basis of the configured grant.

Additionally, the illumination state monitoring apparatus 100 may receive illumination state information from the server 200 on the basis of the configured grant (S43).

Figure 13:
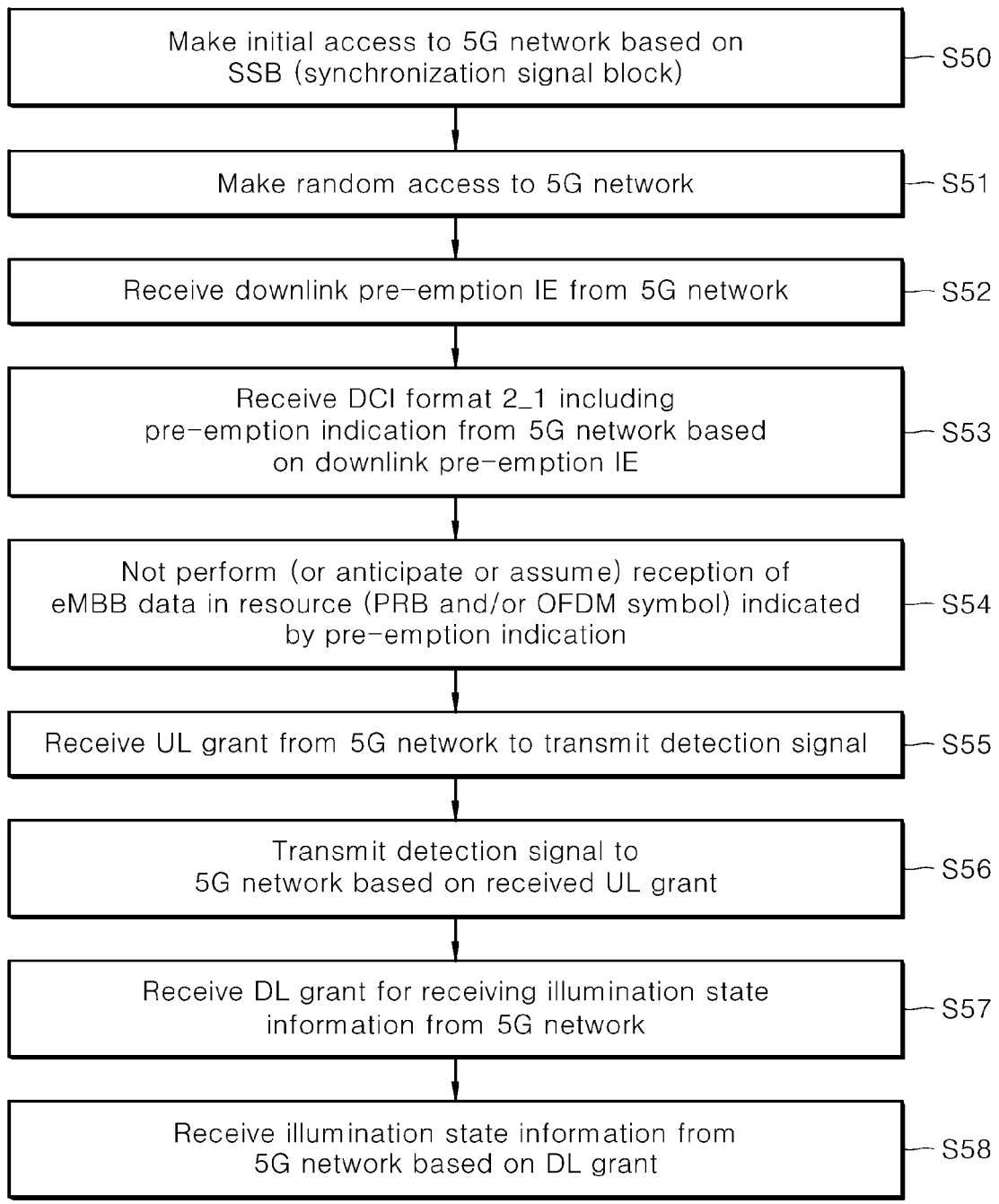

Referring to FIG. 13, the illumination state monitoring apparatus 100 may make initial access to the server 200 on the basis of an SSB to acquire DL synchronization and system information (S50).

Additionally, the illumination state monitoring apparatus 100 may make random access to the server 200 to acquire UL synchronization and/or to transmit UL (S51).

Additionally, the illumination state monitoring apparatus 100 may receive downlink pre-emption IE from the server 200 (S52).

Additionally, the illumination state monitoring apparatus 100 may receive DCI format 2_1 including a pre-emption indication from the server 200 on the basis of the downlink pre-emption IE (S53).

Additionally, the illumination state monitoring apparatus 100 may not perform (or anticipate or assume) reception of eMBB data in a resource (PRB and/or OFDM symbol) indicated by the pre-emption indication (S54).

Additionally, the illumination state monitoring apparatus 100 may receive a UL grant from the server 200 to transmit detection signals (S55).

Additionally, the illumination state monitoring apparatus 100 may transmit detection signals to the server 200 on the basis of the UL grant (S56).

Additionally, the illumination state monitoring apparatus 100 may receive a DL grant for receiving illumination state information from the server 200 (S57).

Additionally, the illumination state monitoring apparatus 100 may receive illumination state information from the server 200 on the basis of the DL grant (S58).

Figure 14:
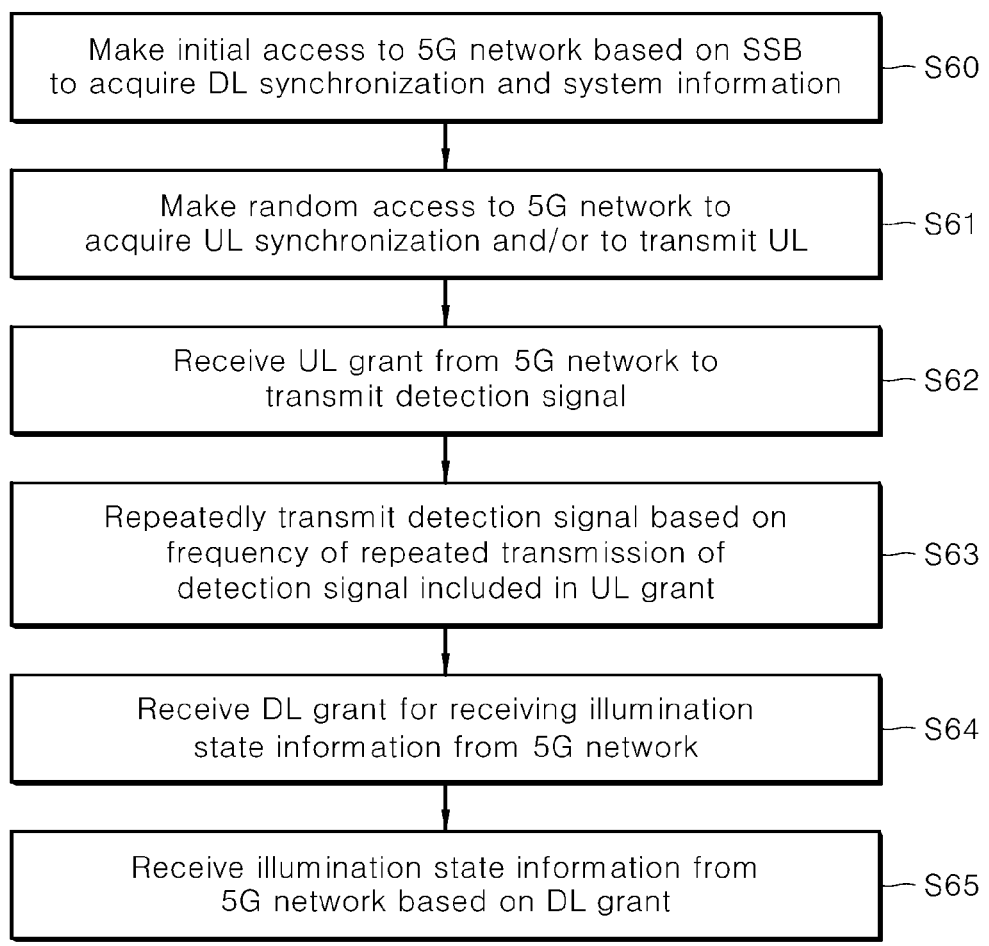

Referring to FIG. 14, the illumination state monitoring apparatus 100 may make initial access to the server 200 on the basis of an SSB to acquire DL synchronization and system information (S60).

Additionally, the illumination state monitoring apparatus 100 may make random access to the server 200 to acquire UL synchronization and/or to transmit UL (S61).

Additionally, the illumination state monitoring apparatus 100 may receive a UL grant from the server 200 to transmit detection signals (S62).

The UL grant may include information on frequency of repeated transmission of detection signals, and the detection signals may be repeatedly transmitted on the basis of the information on frequency of repetition (S63).

Additionally, the illumination state monitoring apparatus 100 may transmit detection signals to the server 200 on the basis of the UL grant.

Repeated transmission of detection signals may be performed through frequency hopping, and first transmission of detection signals may be transmitted in a first frequency resource, and second transmission of detection signals may be transmitted in a second frequency resource.

Detection signals may be transmitted through a narrowband of 6RB (Resource Block) or 1RB (Resource Block).

Additionally, the illumination state monitoring apparatus 100 may receive a DL grant for receiving illumination state information from the server 200 (S64).

Additionally, the illumination state monitoring apparatus 100 may receive illumination state information from the server 200 on the basis of the DL grant (S65).

In FIGS. 11 to 14, the processes of transmitting and receiving detection signals and illumination state information are described as an example of data communication between the illumination state monitoring apparatus 100 and the server 200. However, the above-described communication method may also be applied to any signals transmitted and received between the server 200 and the illumination state monitoring apparatus 100.

The above-described 5G communication technology may compensate a method of data communication performed by the illumination state monitoring apparatus 100 set forth in the present disclosure to specify and clarify the method. However, the method of data communication of the illumination state monitoring apparatus 100, as described above, is not limited to 5G communication, and data communication may be performed by the illumination state monitoring apparatus 100 through various methods that are being used in the art to which the disclosure pertains.

The present disclosure has been described with reference to the embodiments illustrated in the drawings. However, the disclosure is not limited to the embodiments and the drawings set forth herein. Further, various modifications may be made by one having ordinary skill in the art within the scope of the technical spirit of the disclosure. Further, though not explicitly described during description of the embodiments of the disclosure, effects and predictable effects according to the configuration of the disclosure should be included in the scope of the disclosure.

What is claimed is:

1. An illumination state monitoring apparatus, comprising:
    a dual band pass filter having a first pass band in the visible wavelength area and having a second pass band in the infrared wavelength area;
    an optical sensor including a three primary color pixel and an infrared pixel each configured to detect a particular wavelength range of light having passed through the dual band pass filter; and
    a processor configured to: obtain a result of deducting an intensity value of a signal detected by the infrared pixel from an intensity value of a signal detected by the three primary color pixel, calculate an illuminance parameter based on the result, and determine an illumination state on the basis of the illuminance parameter, and
    wherein sensitivity of the three primary color pixel to light having passed through the second pass band and sensitivity of the infrared pixel to light having passed through the second pass band are within a predetermined range,
    wherein the intensity value of the signal detected by the three primary color pixel corresponds to a sum of an intensity value of the signal sensed by the three primary color pixel in the first pass band and an intensity value of the signal sensed by the three primary color pixel in the second pass band, and
    wherein the intensity value of the signal detected by the infrared pixel corresponds to a sum of an intensity value of the signal sensed by the infrared pixel in the first pass band and an intensity value of the signal sensed by the infrared pixel in the second pass band.

2. The illumination state monitoring apparatus of claim 1, wherein the first pass band is formed within a range of 380 nm to 700 nm, and
    the second pass band is formed within a range of 850 nm to 1100 nm.

3. The illumination state monitoring apparatus of claim 1, wherein sensitivity of the infrared pixel to light having passed through the first pass band is less than predetermined sensitivity.

4. The illumination state monitoring apparatus of claim 1, wherein the optical sensor includes a plurality of unit pixels including the three primary color pixel and the infrared pixel.

5. The illumination state monitoring apparatus of claim 4, wherein the three primary color pixel includes an R pixel, a G pixel, and a B pixel respectively detecting three colors of light.

6. The illumination state monitoring apparatus of claim 1, wherein the processor is further configured to: calculate a brightness value on the basis of an average value of signals detected by the three primary color pixel, obtain a second result by deducting an intensity value of a signal detected by the infrared pixel from the brightness value, and calculate the illuminance parameter based on the second result.

7. The illumination state monitoring apparatus of claim 6, wherein the processor is further configured to calculate the brightness value on the basis of the average value of signals detected respectively by an R pixel, a G pixel, and a B pixel included in the three primary color pixel.

8. The illumination state monitoring apparatus of claim 7, wherein the processor is further configured to obtain a third result by deducting an intensity value of an average value of signals detected by the infrared pixel from the calculated brightness value, and calculate the illuminance parameter based on the third result.

9. The illumination state monitoring apparatus of claim 1, wherein the processor is further configured to obtain a second result by deducting an intensity value of an average value of signals detected by the infrared pixel from an intensity value of an average value of signals detected by the three primary color pixel, and calculate the illuminance parameter based on the second result.

10. The illumination state monitoring apparatus of claim 1, wherein, when the illuminance parameter is greater than a reference value, the processor is configured to determine that the illumination state is a day state, and wherein, when the illuminance parameter is less than the reference value, the processor is configured to determine that the illumination state is a night state.

11. The illumination state monitoring apparatus of claim 1, wherein the processor is further configured to generate at least one of a visible image or an infrared image using light detected by the optical sensor.

12. The illumination state monitoring apparatus of claim 11, wherein, when the illumination state is determined as the day state, the visible image is generated, and, when the illumination state is determined as the night state, the infrared image is generated.

13. The illumination state monitoring apparatus of claim 1, further comprising an IR lighting configured to output infrared light, wherein the optical sensor is configured to detect infrared light output by the IR lighting and reflected from an obstacle.

14. The illumination state monitoring apparatus of claim 13, wherein the processor is further configured to control an output from the IR lighting according to the illumination state.

* * * * *